United States Patent [19]
Asher et al.

[11] Patent Number: 5,936,106
[45] Date of Patent: *Aug. 10, 1999

[54] PROCESS WITH POROUS MEANS TO CONTROL REACTION RATE AND HEAT

[75] Inventors: William J. Asher, Half Moon Bay, Calif.; Daryl L. Roberts, Winchester, Mass.; Jerry L. Jones, Menlo Park; Douglas E. Gottschlich, Mountain View, both of Calif.

[73] Assignee: SRI International, Menlo Park, Calif.

[*] Notice: This patent is subject to a terminal disclaimer.

[21] Appl. No.: 08/761,598

[22] Filed: Dec. 6, 1996

Related U.S. Application Data

[63] Continuation of application No. 08/205,183, Mar. 2, 1994, Pat. No. 5,583,240, which is a continuation-in-part of application No. 08/024,989, Mar. 2, 1993, abandoned.

[51] Int. Cl.$^6$ ................................................. C07C 53/00
[52] U.S. Cl. ........................... 554/98; 562/74; 562/95; 562/109; 562/110; 562/123; 568/601
[58] Field of Search ........................... 554/98; 562/74, 562/95, 109, 110, 123; 568/601; 585/276; 423/659; 422/135, 238, 239

[56] References Cited

U.S. PATENT DOCUMENTS

| | | | |
|---|---|---|---|
| 1,685,759 | 9/1928 | Walter | 423/659 |
| 3,375,288 | 3/1968 | De Rosset | 260/669 |
| 3,840,344 | 10/1974 | Garbo | 423/450 |
| 3,844,936 | 10/1974 | Newson | 208/108 |
| 3,918,917 | 11/1975 | Ashina | 23/283 |
| 4,056,602 | 11/1977 | Matovich | 423/349 |
| 4,179,470 | 12/1979 | Mischenko | 260/580 |
| 4,187,253 | 2/1980 | Kurtz | 260/662 R |
| 4,261,916 | 4/1981 | Crosby | 562/123 |
| 4,352,864 | 10/1982 | Struthers | 429/18 |
| 4,442,206 | 4/1984 | Michaels | 435/68 |
| 4,624,748 | 11/1986 | Haunschild | 203/29 |
| 4,786,597 | 11/1988 | Matson | 435/41 |
| 5,583,240 | 12/1996 | Asher | 554/98 |

FOREIGN PATENT DOCUMENTS

| | | | |
|---|---|---|---|
| 0432109 | 11/1990 | European Pat. Off. | C01G 43/00 |
| 61-004528 | 5/1986 | Japan | B01J 19/00 |
| 2095123 | 7/1981 | United Kingdom | B01F 3/04 |

OTHER PUBLICATIONS

V. Gryaznov et al., in an article entitled "Selectivity in Catalysis by Hydrogen–porous Membranes", published in Discussions of the Faraday Society, No. 72 (1982) at pp. 73–78 no month.

V.M. Gryaznov, in an article entitled "Hydrogen Permeable Palladium Membrane Catalysts", published in Platinum Metals Review, 1986, 30, (2), pp. 68–72 no month.

J.N. Armor, in a review entitled "Catalysis with Permselective Inorganic Membranes", published in Applied Catalysis, 49 (1989), pp. 1–25 no month.

K. Omata, et al., in *Applied Catalysis*, vol. 52, L1–L4 (1989) no month.

O. Levenspiel, "Design for Multiple Reactions", Chapter 7 in *Chemical Reactions Engineering*, 2nd Ed., John Wiley and Sons, New York, New York, 1983, no month.

R. Mihail et al., in *The Chemical Engineering Journal*, vol. 23, pp. 151–160, (1982) no month.

A.K. Barnham et al. (1983), in "High Pressure Pyrolysis of Colorado Oil Shale", Symposium on Geochemistry and Chemistry of Oil Shale, Fuel Chemistry Division, American Chemical Society Meeting, Seattle, Washington, Mar. 20–25, 1983, p. 114ff.

K.M. Jeong et al., "Indigenenous Mineral Matter Effects in Pyrolysis of Green River Oil Shale", Symposium Geochemistry and Chemistry of Oil Shale, Fuel, Geo & Petroleum Chemistry Division, American Chemical Society National Meeting, Seattle, Washington, Mar. 20–25, 1983, p. 228 ff.

Y.T. Shah et al. *Chemical Engineering Science*, vol. 25, pp. 1947–1948, (1979) no month.

G. Juncu et al., *Computers Chemical Engineering*, vol. 19(3), pp. 363–373, (1995) no month.

A. Akyurtlu et al., *Computers & Chemical Engineering*, vol. 10(4), pp. 361–365, (1986) no month.

R. De Vos et al., *Chemical Engineering Science*, vol. (12), pp. 1711–1718, (1982) no month.

V. Hlavacek et al., *Chemical Engineering Science*, vol. 27, pp. 177–186 (1972) no month.

R. De Vos et al., *Chemical Engineering Science*, vol. 37(12), pp. 1719–1926 (1982) no month.

*Primary Examiner*—Michael Lewis
*Assistant Examiner*—Stuart L. Hendrickson
*Attorney, Agent, or Firm*—Peters, Verny, Jones & Biksa, LLP

[57] ABSTRACT

An process for forming a product which may be in a liquid phase is disclosed wherein a first reactant, preferably a liquid reactant, is directly fed into a reaction zone containing mixing elements and which comprises a first compartment of a reactor. A second reactant, which is maintained at a higher pressure, is fed into a second compartment of the reactor separated from the first compartment by a porous wall. The second reactant passes through this porous wall into the reaction zone to react with the first reactant. The process thereby controls rates of the reactions and the exothermic heats generated by the reactions. Pulsatile flow in one or both reaction compartments improves mixing. An evaporator for a portion of the product improves product quality and permits higher reaction temperatures in the reactor.

39 Claims, 6 Drawing Sheets

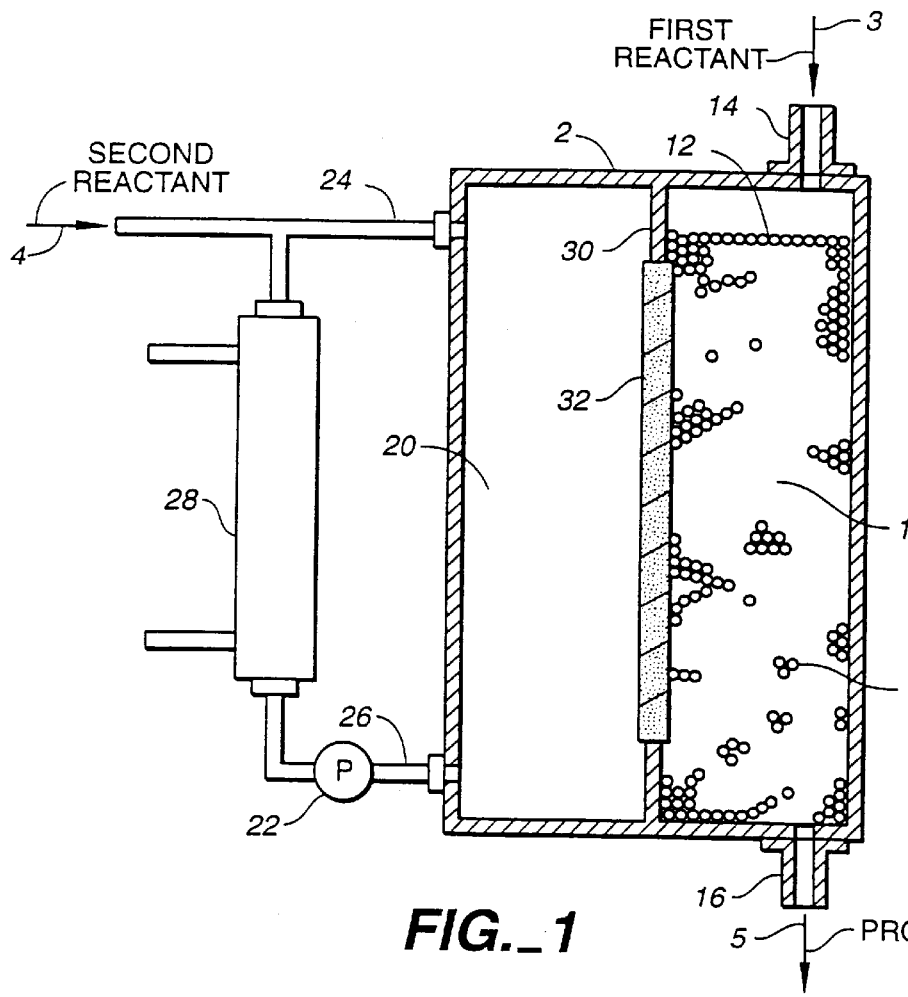
FIG._1
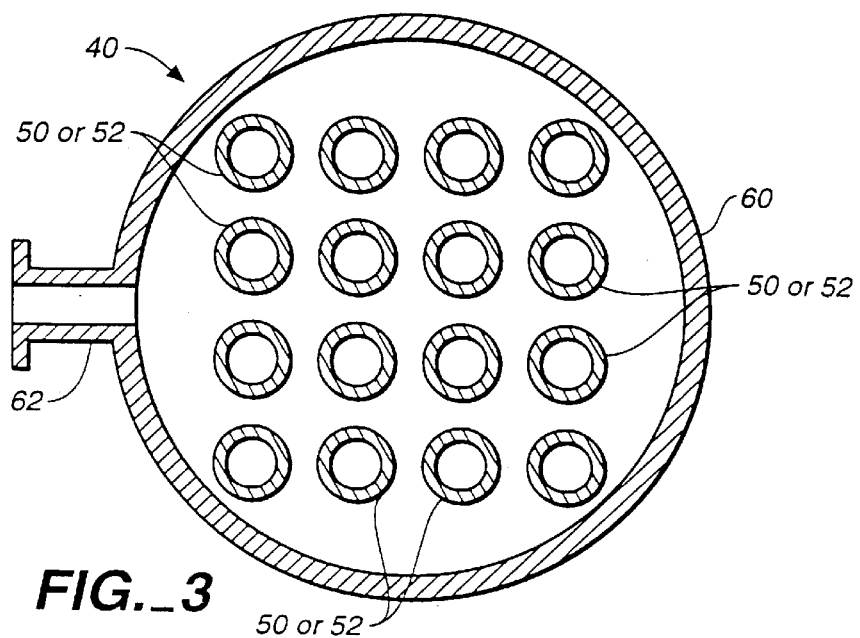
FIG._3

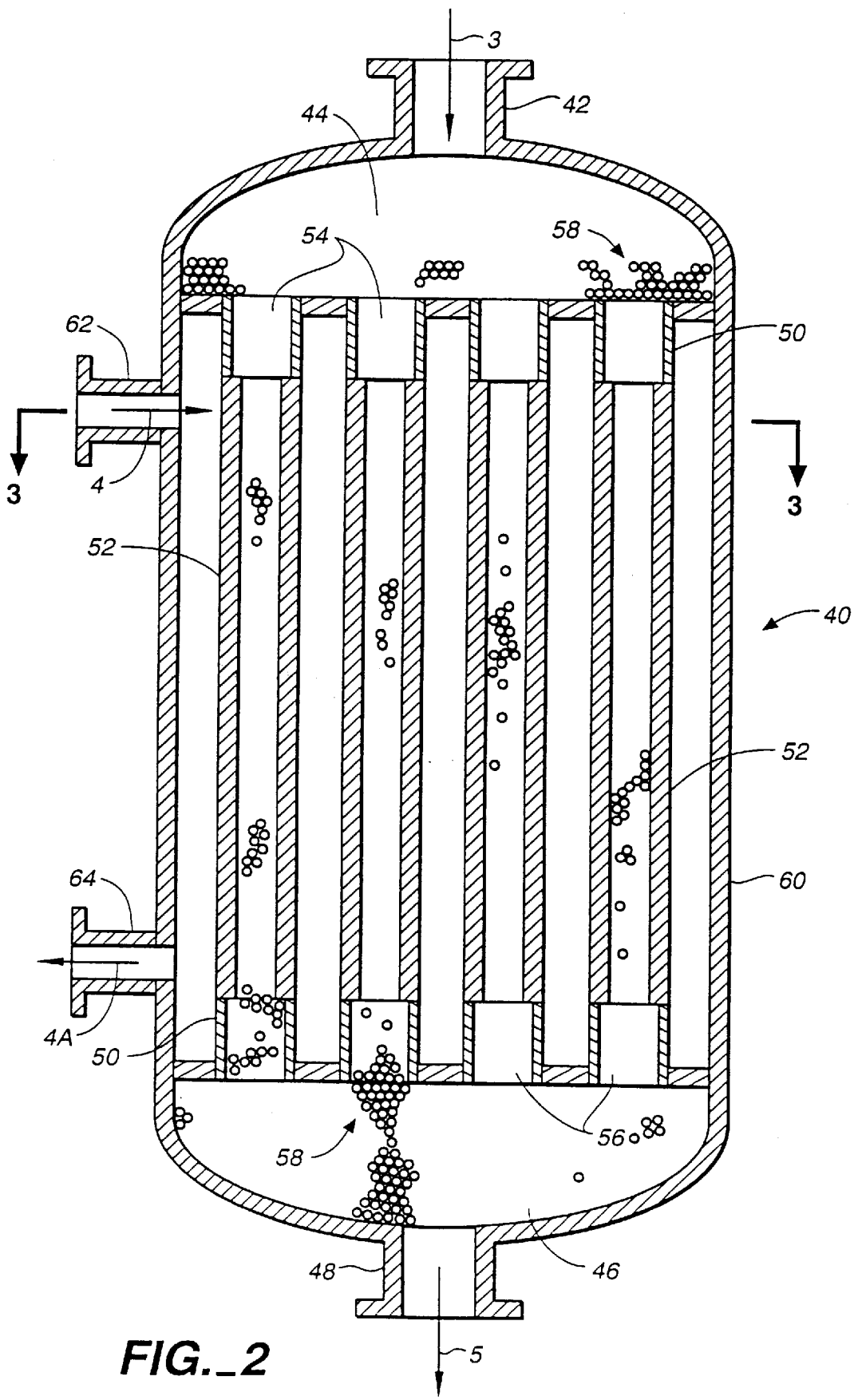
FIG._2

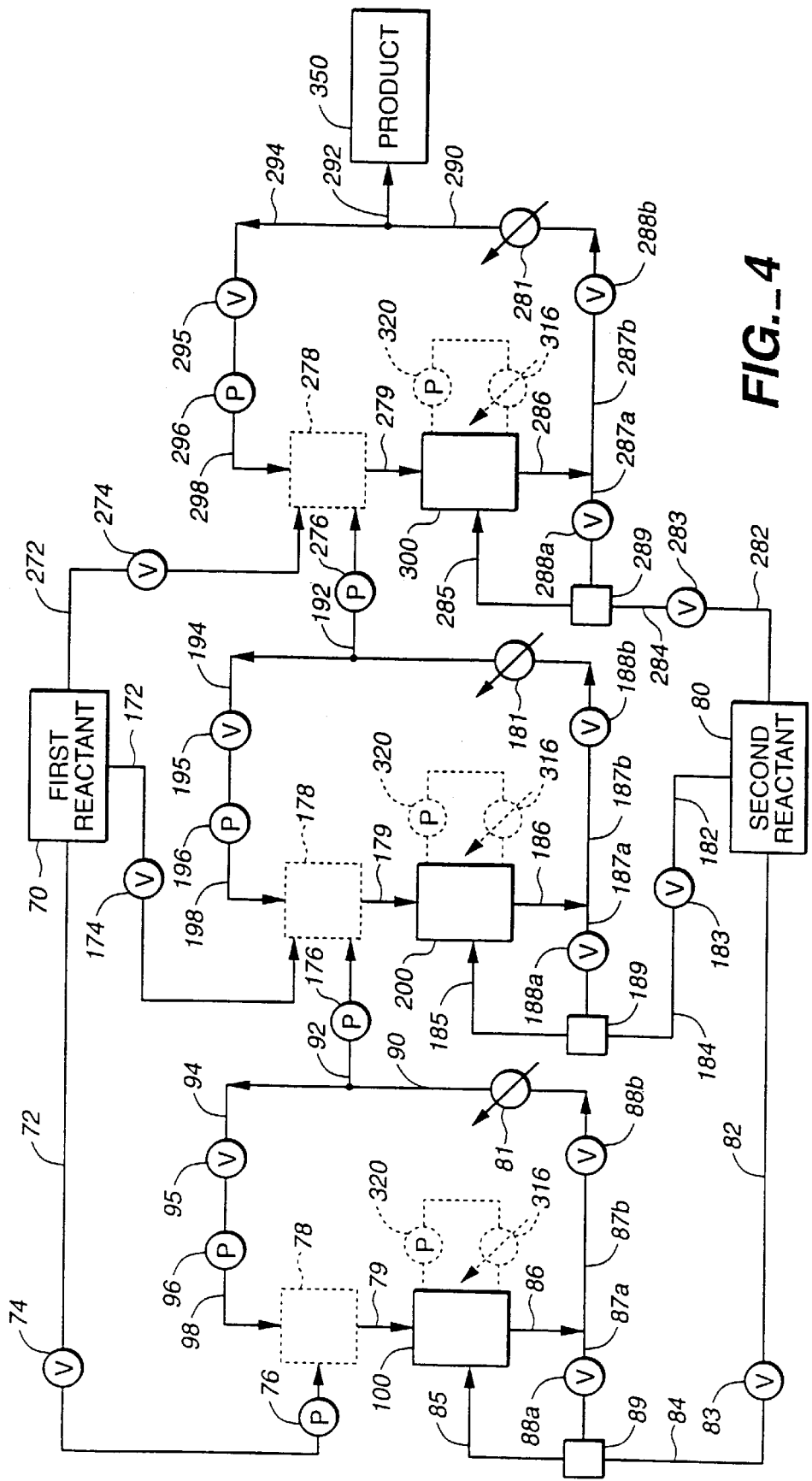
FIG._4

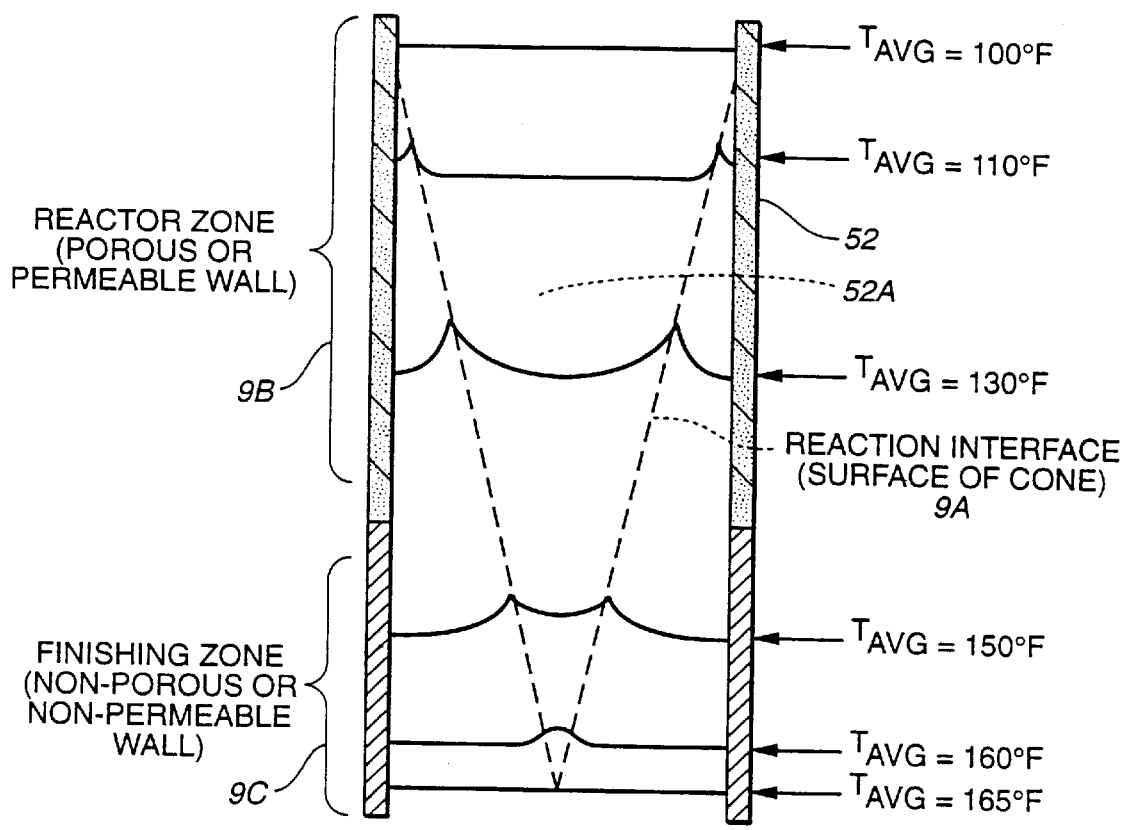
FIG._5
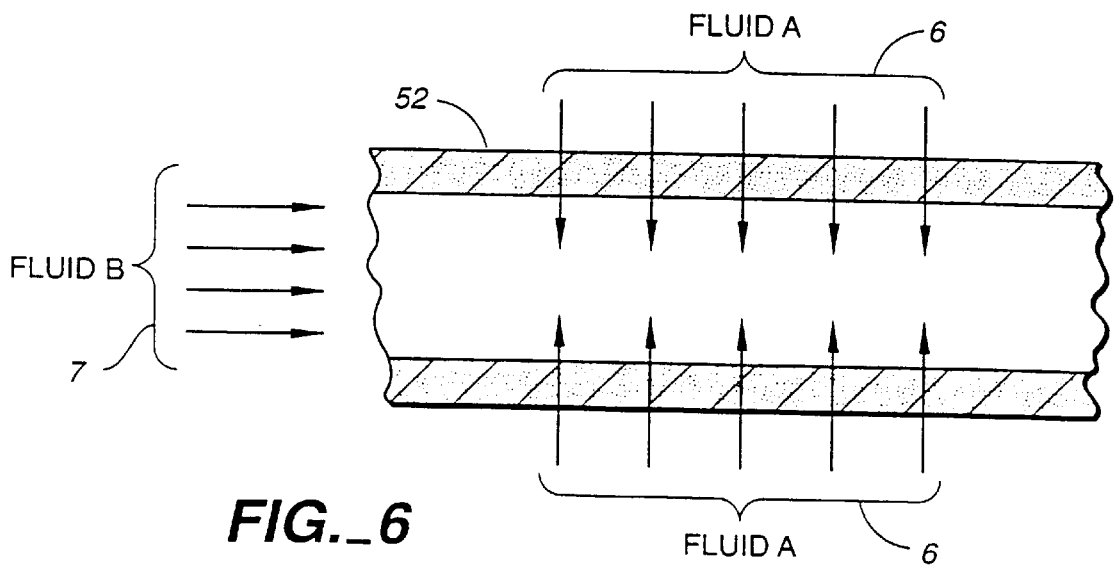
FIG._6

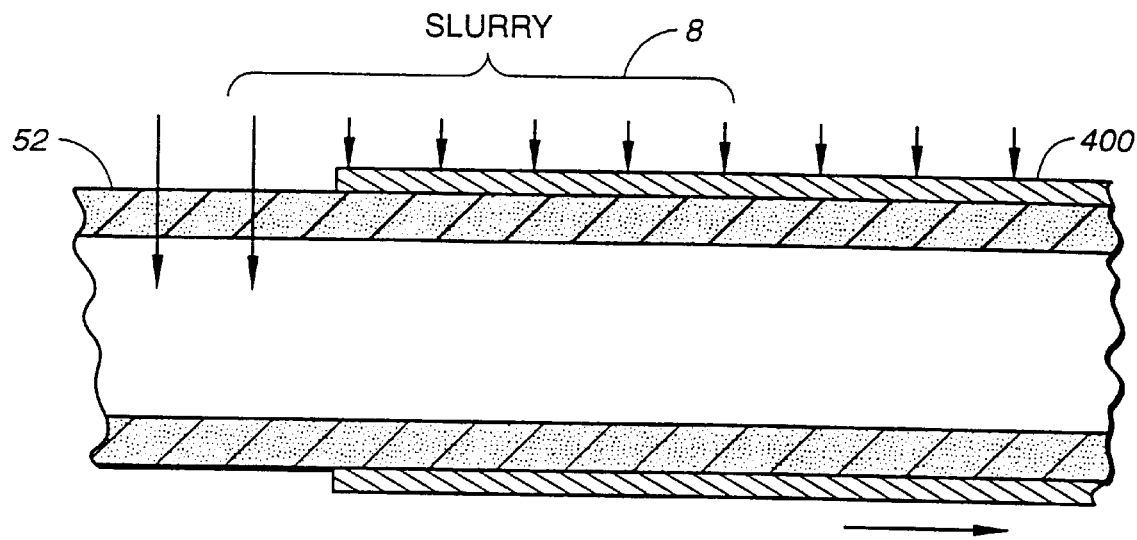
FIG._7A
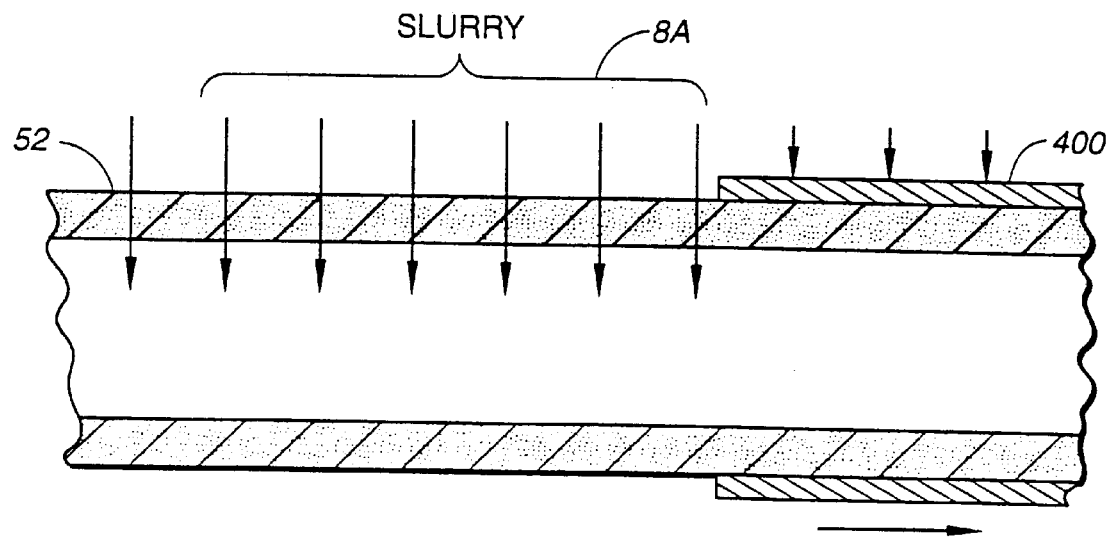
FIG._7B

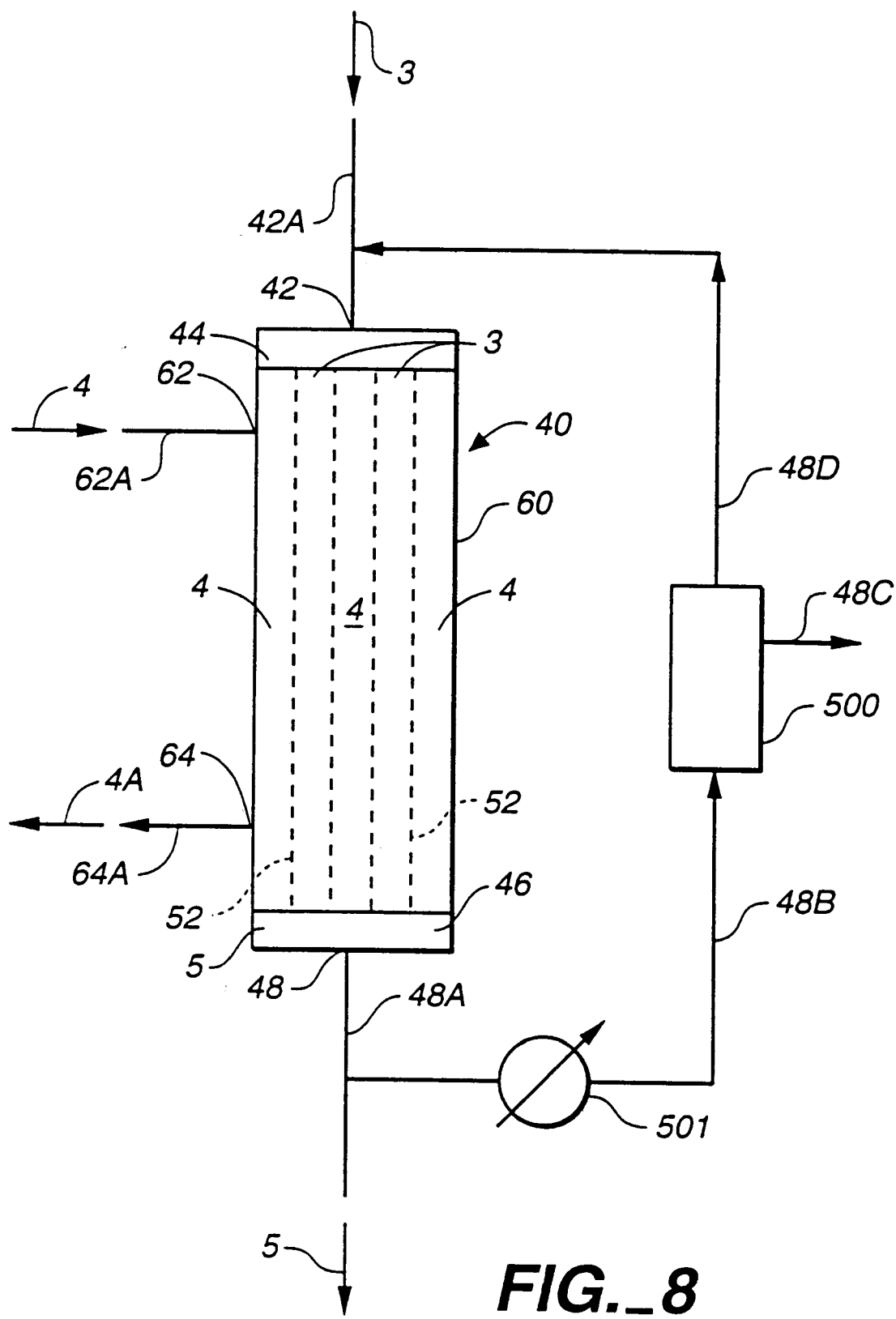
FIG._8

PROCESS WITH POROUS MEANS TO CONTROL REACTION RATE AND HEAT

RELATED APPLICATIONS

This is a continuation of application, Ser. No. 08/205,183, filed on Mar. 2, 1994 now U.S. Pat. No. 5,583,240, which is a continuation-in-part of abandoned application Ser. No. 08/024,989 filed Mar. 2, 1993. This prior application is incorporated herein by reference in its entirety.

BACKGROUND OF THE INVENTION

1. Field of the Invention

This invention relates to a controlled process for reacting together two or more reactants. One reactant is fed at a first pressure into a first zone in a reactor containing mixing means and a second reactant is fed at a higher pressure into a second zone in the reactor. The second zone is separated from the first zone by a porous barrier wall through which the second reactant passes. In this way, a controlled flow of second reactant into the first reactor zone and control of the reaction are achieved.

2. Description of the Related Art

Processes for forming a reaction product from at least two reactants wherein the desired product is a liquid phase or high density supercritical phase at the reaction conditions are typically carried out in a thin film reactor such as a falling film reactor. For example, Ashina et al. in U.S. Pat. No. 3,918,917 describes a multi-tube thin-film type reaction apparatus for the reaction of an organic compound and gaseous sulfur trioxide comprising a reaction tube provided with gas and liquid feeding tubes at the upper end of the reaction tube.

It is also known to carry out such reactions radially by passing reactants into a cylindrical reactor through the outer walls of the cylinder and to collect the resultant product through an apertured central tube in the cylindrical reactor.

For example, Newson in U.S. Pat. No. 3,844,936 discloses a radial desulfurization process and apparatus wherein both oil and hydrogen are peripherally introduced through sidewall nozzles into a cylindrical shell packed with catalyst. A tube having apertures therein passes through the center of the cylindrical shell, and both the oil and the hydrogen gas, passing through the catalyst in the outer shell, enter the central tube through the apertures and leave the apparatus.

De Rosset in U.S. Pat. No. 3,375,288 discloses a process and apparatus for dehydrogenation of hydrocarbons wherein a hydrocarbon feedstock to be dehydrogenated is fed into a reaction zone containing a particulate dehydrogenation catalyst. The reaction mixture, while undergoing dehydrogenation, is also contacted with one side of a tubular thin permeable membrane, such as a silver tube which has a high permeability to oxygen. Oxygen at a higher partial pressure is maintained on the opposite surface of the tube and diffuses through the tube to react with the hydrogen being liberated in the dehydrogenation process.

The use of permeable membrane catalysts, particularly the use of palladium alloy catalyst membranes, have been the subject of much investigation. Mischenko et al. in U.S. Pat. No. 4,179,470 describe a process for producing aniline by catalytic hydrogenation of nitrobenzene which comprises using a membrane catalyst which is essentially an alloy of palladium and ruthenium. The hydrogenation is carried out by feeding nitrobenzene on one side of the membrane catalyst and hydrogen on the other side. The hydrogen reactant diffuses through the membrane catalyst, which is shaped as a foil, into the hydrogenation chamber containing the nitrobenzene reactant.

Gryaznov et al., in an article entitled "Selectivity in Catalysis by Hydrogen-porous Membranes", published in Discussions of the Faraday Society, No. 72 (1982) at pages 73–78, disclose the use of hydrogen-porous membrane catalysts through which hydrogen may pass, either during a dehydrogenation reaction to raise the reaction rate and/or suppress side reactions; or during a hydrogenation reaction to independently control to some extent the surface concentration of hydrogen and to obtain incompletely hydrogenated products which are thermodynamically unstable in the presence of hydrogen.

V. M. Gryaznov, in an article entitled "Hydrogen Permeable Palladium Membrane Catalysts", published in Platinum Metals Review, 1986, 30, (2) at pages 68–72, describes the catalytic properties of selected palladium binary alloy membranes, which are only permeable to hydrogen, during hydrogenation and dehydrogenation reactions.

Armor, in a review entitled "Catalysis with Permselective Inorganic Membranes", published in Applied Catalysis, 49 (1989) at pages 1–25, discusses the work of others with various catalytic membranes, including hydrogen-permeable palladium membranes, ceramic-supported palladium membrane catalysts, ceramic membranes permeable to oxygen, porous polymer resins used as membranes catalysts, and alumina membrane catalysts.

K. Omata, et al., in *Applied Catalysis*, Vol. 52, L1–L4 (1989) disclose the oxidative coupling of methane using a membrane reactor. The catalyst is on the membrane or barrier, and the reactor has no mixing elements.

W. M. Haunschild in U.S. Pat. No. 4,624,748 discloses a catalyst system for use in a distillation column reaction. The entire reaction mixture passes through the permeable material. These ether-forming reactions occur at low temperatures up to about 100° C. Higher temperatures apparently would destroy the membrane.

All patent applications, patents, articles, references, standards and the like cited herein are incorporated herein by reference in their entirety.

What is needed is a process that makes it possible to control the rate of a chemical reaction by controlling the rate of contact of the one or more reactants. The present invention accomplishes these objectives of controlling reaction rate by using a porous barrier through which one or more of the reactants is introduced to the zone containing the other reactant(s), and contacting them using mixing elements.

SUMMARY OF THE INVENTION

The present invention comprises a process for forming a product which may be in a liquid phase wherein a first reactant, or combination of first reactants, is directly fed into a reaction zone containing mixing elements and a second reactant or a combination of second reactants, which is maintained at a higher pressure, is transported through a porous barrier into the reaction zone to react with the first reactant. Preferably, the first reactant is a liquid and the second reactant is also a liquid. Control of both the reaction rate and control of the exothermic heat are made possible by the process.

In one embodiment, the present invention relates to an improved process for forming a product by reaction of one or more first reactants and one or more second reactants which comprises:

(a) feeding into a first reactor zone one or more first reactants at a first pressure;

(b) feeding one or more of the second reactants at a second pressure higher than the first pressure into a second reactor zone separated from the first reactor zone by a porous wall capable of being penetrated by the second reactant; and (c) maintaining the pressure within the second reaction zone at all locations of the porous wall higher than the pressure in the first reaction zone at corresponding locations of the porous wall, to thereby inhibit any flow through the porous wall from the first reaction zone to the second reaction zone;

whereby one or more second reactants will pass through the porous wall to contact one or more first reactants in the first reactor zone and form the product.

In another embodiment, the present invention relates to an improved process for forming a product by reaction of one or more first reactants and one or more second reactants which comprises:

(a) feeding into a first reactor zone containing mixing elements therein one or more first reactants at a first pressure;

(b) feeding one or more second reactants at a second pressure higher than the first pressure into a second reactor zone separated from the first reactor zone by a porous wall capable of being penetrated by the one or more second reactants; and (c) maintaining the pressure within the second reaction zone at all locations of the porous wall higher than the pressure in the first reaction zone at corresponding locations of the porous wall, to thereby inhibit any flow through the porous wall from the first reaction zone to the second reaction zone;

whereby one or more second reactants will pass through the porous wall to contact one or more first reactants in the first reactor zone and form the product.

In another embodiment, the present invention relates to an improved exothermic process for forming a product by reaction of one or more first liquid reactants with one or more second liquid reactants which comprises:

(a) feeding one or more first liquid reactants at a first pressure through a first reactor zone having mixing elements therein;

(b) feeding one or more second liquid reactants at a second pressure higher than the first pressure into a second reactor zone separated from the first reactor zone by a porous wall capable of being penetrated by one or more second liquid reactants; and (c) maintaining the pressure within the second reaction zone at all locations of the porous wall higher than the pressure in the first reaction zone at corresponding locations of the porous wall, to thereby inhibit any flow through the porous wall from the first reaction zone to the second reaction zone;

whereby one or more second liquid reactants will pass through the porous wall to contact one or more first liquid reactants in the first reactor zone and form the product.

In yet another embodiment, the present invention relates to an improved exothermic process for forming a product by reaction of one or more liquid first reactants with one or more second reactants, at least one of which is gaseous at ambient conditions, which comprises:

(a) feeding one or more liquid first reactants at a first pressure through a first reactor zone having mixing elements therein;

(b) feeding one or more second reactants, at least one of which is gaseous at ambient conditions, at a second pressure higher than the first pressure into a second reactor zone separated from the first reactor zone by a porous wall capable of being penetrated by the one or more second reactants; and (c) maintaining the pressure within the second reaction zone at all locations of the porous wall higher than the pressure in the first reaction zone at corresponding locations of the porous wall, to thereby inhibit any flow through the porous wall from the first reaction zone to the second reaction zone;

whereby the one or more second reactants passes through the porous wall to contact the one or more liquid first reactants in the first reactor zone and form the product.

In still another embodiment, the present invention relates to an improved exothermic process for forming a product by reaction of one or more first reactants and one or more second reactants which comprises:

(a) feeding a first reactant at a first pressure through a first reactor zone containing mixing elements having at least one dimension equal to from about ½ to about 1/100 of the largest dimension of the first reactor zone normal to the flow of the first reactant through the first reactor zone;

(b) feeding a second reactant at a second pressure higher than the first pressure into a second reactor zone separated from the first reactor zone by a porous wall capable of being penetrated by the second reactant; and (c) maintaining the pressure within the second reaction zone at all locations of the porous wall higher than the pressure in the first reaction zone at corresponding locations of the porous wall, to thereby inhibit any flow through the porous wall from the first reaction zone to the second reaction zone;

whereby the second reactant passes through the porous wall to contact the first reactant in the first reactor zone and form the product.

In still another embodiment, the present invention relates to an improved process for forming a product by reaction of a first liquid reactant with a second liquid reactant, which process comprises:

(a) feeding a first liquid reactant at a first pressure into a first reactor zone containing particles having at least one dimension equal to from about ½ to about 1/100 of the largest dimension of the first reactor zone normal to the flow of the liquid reactant through the first reactor zone;

(b) feeding a second liquid reactant at a second pressure higher than the first pressure into a second reactor zone separated from the first reactor zone by a porous wall capable of being penetrated by the second liquid reactant; and (c) maintaining the pressure within the second reaction zone at all locations of the porous wall higher than the pressure in the first reaction zone at corresponding locations of the porous wall, to thereby inhibit any flow through the porous wall from the first reaction zone to the second reaction zone;

whereby the second liquid reactant passes through the porous wall to contact the first liquid reactant in the first reactor zone and form the product.

In still another embodiment, the present invention relates to an apparatus for forming a product by reaction of one or more first reactants with one or more second reactants, which apparatus comprises:

a reactor having one or more porous members therein dividing the reactor into first and second reactor ones capable of being maintained at different pressures; whereby the one or more first reactants in the reactor zone maintained at a higher pressure will pass through the one or more porous members into the reactor zone maintained at a lower pressure to contact one or more second reactants in the reactor zone maintained it a lower pressure to form the product.

In still another embodiment, the present invention relates to any of the improved processes described herein, wherein the process further includes step (d), (e) and (f);

(d) conveying a portion of the reaction product of step (c) to an evaporator;

(e) separating volatile reactants or reaction products wherein the vapor pressure of the volatile reactants or reaction products is about 1 mm of Hg or higher at the temperature of the reaction in step (c); and (f) optionally recycling all or a portion of all of the reaction product liquid now depleted of volatile reactants, reaction products or a combination thereof to the first reactor zone of step (a).

In another aspect, the rates of flow of the first reactant in the reactor are cyclic (pulsatile) from a maximum flow rate in one direction to a rate of about a 20% reverse flow of the maximum flow rate, and return to maximum flow rate.

In another aspect, the present invention also concerns a separation, e.g. a flash evaporation, of reactants or reaction products. This separation improves the yield of the final product by reducing unwanted side reactions and reduces the formation of unwanted by-products.

BRIEF DESCRIPTION OF THE DRAWINGS

FIG. 1 is a schematic representation of a partially cutaway vertical cross-sectional view illustrating the process of the invention being carried out in its simplest form.

FIG. 2 is a schematic representation of a vertical cross-sectional diagrammatic view of an apparatus suitable for use in carrying out the process of the invention.

FIG. 3 is a top view, in cross-section of the apparatus of FIG. 2 taken along lines 3—3.

FIG. 4 is a schematic representation of a diagrammatic view of a series of stages of the apparatus generally illustrated in FIGS. 2 and 3.

FIG. 5 is a schematic representation of a graph depicting the temperature and a conical reaction interface along the flow line within a tubular reactor. Those skilled in the art will recognize that dependent on relative reaction rates and transport rates, the reaction interface can assume many different shapes.

FIG. 6 is a schematic representation of a diagrammatic illustration of the respective flows of Fluid A across the walls of the porous tube and Fluid B through the tube.

FIG. 7A is a schematic representation of a cross-sectional view illustrating how the porosity of a porous tube may be varied along its length, with a shield over a portion of the porous tube.

FIG. 7B is a schematic representation of a cross-sectional view illustrating how the porosity of a porous tube may be varied along its length, with the shield shown in FIG. 7A moved to expose a further portion of the porous tube.

FIG. 8 is a schematic representation of the apparatus of the process additionally having the separator (or evaporator) component and recycle mode.

DETAILED DESCRIPTION OF THE INVENTION

The present invention comprises an process for forming a chemical product which may be in a liquid phase wherein a first reactant, preferably a liquid reactant, is directly fed into a reaction zone containing mixing elements and which comprises a first compartment of a reactor. A second reactant which may be either a liquid or gaseous reactant, and which is maintained at a higher pressure, is fed into a second compartment of the reactor separated from the first compartment by a porous wall or barrier. The second reactant passes through this porous wall into the reaction zone containing mixing elements to react with the first reactant under controlled reaction conditions.

Basic Apparatus Useful in the Process

Referring now to FIG. 1, the concept of the process of the invention is illustrated in its simplest form. Within a reactor 2, a first reactor compartment or zone 10 and a second reactor compartment or zone 20 are provided, separated by a wall 30 having a porous portion 32 spaced from both the top and bottom of wall 30. Reactor zone 10 is packed with mixing elements 12, such as glass balls, preferably to a level above porous portion 32 of wall 30 so as to introduce mixing into the first reactant stream 3 prior to transporting the second reactant into reactor zone 10.

A first reactant 3, which is preferably in a liquid phase, is fed through an entrance port 14 into first reactor zone 10 and a second reactant 4, which is at a higher pressure than the pressure in first reactor zone 10, is fed through entrance port 24 into second reactor zone 20. The second reactant 4 passes through porous wall portion 32 into first reactor zone 10 where it reacts to form a product 5 which is removed from first reactor zone 10 via exit port 16.

If desired, an exit port 26 is provided in second reactor compartment 20 to permit the second reactant 4 to be circulated through second reactor compartment 20, using a pump 22. As shown in FIG. 1, a heat exchanger 28 may be optionally used to cool the circulating second reactant to control the heat in reactor 2.

In a preferred mode, as shown in FIGS. 2 and 3, the reaction will be carried out in a multiple tube reactor 40, having one or more tubes 50 housed in an outer shell 60 wherein a portion 52 of the wall of each tube 50 will comprise porous material. Mixing elements 58 are placed within each tube 50 and a first reactant 3, which preferably is a liquid reactant, will be fed through an inlet port 42 in the top of reactor 40 into an inlet plenum or manifold 44 connected to the open top end 54 of each tube 50. It will be noted that preferably mixing elements 58 are also placed in inlet manifold 44 so that mixing flow conditions are already created in the flow of first reactant in reactor 40 before the first reactant reaches tubes 50 and, therefore, before introduction of the second reactant 4 into the flow stream.

While 16 such tubes are illustrated in the reactor shown in FIGS. 2 and 3, it will be understood that this is for illustrative purposes only and a commercial embodiment for practicing the process of the invention would utilize a large number of such tubes, e.g., as many as 50 or more such porous tubes.

The second reactant 4 is introduced through a first side port 62 in shell 60 of reactor 40 at a higher pressure than the first reactant to circulate around all of the outside surfaces of tubes 50, including the porous portions 52 through which the second reactant is transported to contact and react with the first reactant 3 within tubes 50.

The resultant product 5, as well as any unreacted reactants, may then exit via open bottom ends 56 of each tube 50 into a second plenum or manifold 46 which, it will be noted, also contains mixing elements 58. This positioning of mixing elements 58 along the entire length of each tube 50, even beyond the porous portion of each tube 50 and into lower manifold 46, is provided because there may be continued reaction between the first reactant 3 and second reactant 4 even after the flow of product 5 and reactants (3 and 4) passes beyond the porous portion of each tube 50. That is, the reaction zone may extend beyond the end of the porous portion of each tube 50.

The product 5, as well as any unreacted reactants, may leave reactor 40 via exit port 48 at the bottom of reactor 40. An exit port 64 in shell 60 of reactor 40 is also provided for the second reactant 4 to permit circulation thereof, as well as possible additional use of the second reactant as a coolant for reactor 40, as discussed above.

FIG. 5 is a schematic representation of a graph which depicts the change in temperature and a conical reaction interface 9A along the flow line within a porous tubular reactor, e.g. 52, having a reactor zone 9B. Within tube 52 is found a radial reaction zone 52A surrounded by a porous wall through which the second reactant 4 passes to react with the first reactant 3. The finishing zone 9C is not porous. The average temperatures are shown at various points in the tube. The graph illustrates that the temperature within the reactor gradually rises with no hot spots in the reactor, e.g. 40.

The porous barrier 52 may or may not have catalytic properties. Preferably the barrier or wall does not have catalytic properties.

Mixing Elements Used in Process

The presence of mixing elements 58 in the reaction zone provide a more thorough mixing of the reactants in the reaction zone to prevent or inhibit the occurrence of hot spots in the reaction zone which could result in creation or concentration of excessive heat which could damage either reactants or product. Other applicable mixing elements have been patented and used commercially. These include those that were covered by U.S. Pat. Nos. 3,922,220 and 3,862,022 and are commonly identified as Kenics static mixers in the patent and scientific literature and available from Kenics Corporation, 125 Flagship Drive, North Andover, Mass. 01845. The mixing elements preferably comprise inert materials such as glass or ceramic balls or other non-reactive packing type material such as Raschig rings or beryl saddles. In some embodiments, the mixing elements are stationary. In other embodiments, the mixing elements are mobile within the reaction zone. In one embodiment, the mixing elements do not have catalytic properties.

It is also within the scope of the invention, in another embodiment, for the mixing elements to have catalytic properties as well, although it will be appreciated that the main purpose of the mixing elements is to create multiple divisions and recombining of flow and thus provide for more thorough mixing of the reactants in the reaction zone in the reactor.

Thus, particulate catalysts conventionally utilized usually comprise finely divided materials characterized by high surface areas and short diffusion distances to maximize the contact area between catalyst and reactants, at the expense of high pressure drops, resulting in lower throughput or the need to utilize more energy in passing the reactants through such a catalyst bed.

In contrast, the mixing elements utilized in the process of the invention are much larger in size than conventional catalysts so that any negative impact on flow rates by the presence of such mixing elements will not be significant.

Preferably the mixing elements utilized in the process of the invention have a major dimension which ranges from about $1/100$ to about $1/2$, preferably from about $1/10$ to about $1/3$, of the largest dimension in the plane of the reaction zone normal to the flow of the reactants through the reaction zone. For example, when the mixing elements are commonly known Kenics elements in a cylindrical tube, the elements bisect the tube diameter and function as mixing elements because they are bisected by the elements upstream into two functional elements. Thus, the characteristic major dimension in this example is $1/2$ of the diameter of the tube. For example, when the mixing elements comprise balls and the reaction zone comprises a cylindrical tube, the balls will have a diameter of from about $1/100$ to about $1/2$, preferably from about $1/10$ to about $1/3$, of the diameter of the tube. Thus, if the reaction zones are located within 2 cm cross sectional inner diameter (I.D.) tubes having porous tube walls, spherical mixing elements utilized within the tubes will have diameters ranging from about 0.2 millimeters (mm) to 10 mm, and preferably will range from about 2 mm to 6.7 mm.

It should be further noted that while the presence of the mixing elements has been illustrated in the reaction zone, as well as in the region just prior to the mixing zone, the mixing elements may also be reset in the conduits leading from the reactor to heat exchangers, and may even be used in the heat exchanger tubes as well. This is particularly true where the reaction zone, comprising the porous portion of a tube and the region of the tube beyond the porous region, is joined to a heat exchanger forming an extension of the same tube, in which case the entire tube is advantageously packed with such mixing elements.

The above configuration makes maximum uses of the tube volume. However, for many chemistries, the concern about the effects of possible leakage between the shell side fluids, the second reactant, and the cooling water would preclude its use. For example, in the case of sulfonating an organic compound, the second reactant 4 is $SO_3$, which would be separated from the cooling water by a tube sheet. A pin hole would produce hot sulfuric acid which would soon enlarge the pin hole. In these cases, separate reactors and heat exchanges would be preferred.

Porous Material Used In the Process

The porous material initially separating the two reactants, and through which the second reactant passes, will generally comprise a material of controlled porosity, as opposed to a pore-free permeable membrane through which transport is by diffusion, since such pore-free membranes provide poor rate performance due to the low transport rate across the membrane. The porosity and pressure are adjusted to provide a minimum flow of the second reactant across the porous material, relative to the flow of the first reactant on the low pressure side of the porous material (32 and/or 52), sufficient to permit reaction of the first reactant on the low pressure side with the second reactant passing through the porous material.

However, the flow rate of the second reactant 4 across the porous material, i.e., the porosity and pressure used, must be adjusted to not exceed that flow rate which will provide either reaction between the reactants or dissolving of the second reactant 4 into the first reactant 3 on the low pressure side, i.e., a second phase (comprising the high pressure second reactant) should not be substantially formed in the reaction zone. By "substantially" is meant that not more than 10% of the high pressure second reactant passing through the porous material (32 and/or 52) should form a second phase in the reaction zone.

Typically, the porous material will comprise a sintered metal. The porous material may comprise a high porosity (coarse) material which has been coated with a second material to control the pore size. For example, a porous stainless steel material may be coated with a non-reactive ceramic material such as zirconia. This, for example, could be done by coating a commercially produced sintered stainless steel tube with finely divided zirconia or titania powder dispersed in a vehicle, allowing the vehicle to evaporate, and then firing the zirconia (or titania)-coated tube at a temperature of 1000° C.

The coating of the commercially produced porous tube may be carried out by pumping a slurry or suspension of the coating materials, e.g., zirconia or titania, through the walls of the porous tube, i.e., from the outside of the tube to the inside—or vice versa— until one achieved the desired porosity. When the coating or changing of the porosity is done by pumping a slurry from the outside to the inside of the porous tube, the need for heating to stabilize the porosity of the tube can sometimes be eliminated.

In one embodiment of such modification of an existing porosity of porous tube 52, it may be advantageous to provide a variable or profiled porosity in porous tube 52. Referring to the graph of FIG. 6, the pressure of Fluid B (aka 7) traveling inside porous tube 50 gradually drops as Fluid B (7) flows within tube 52. This, in turn, means that the change in pressure ΔP, across the porous wall of tube 52 increases along the tube in the direction of flow of Fluid B (7) (assuming that Fluid A (aka 6) has a constant pressure all along the length of tube 50 and/or 52).

To compensate for this variable pressure drop across the wall of tube 52, there should be a continually decreasing porosity in the porous wall of tube 52. One way of achieving this, as shown in FIGS. 7A and 7B, is to cover either the inside or outside surface of porous tube 52 with a sleeve 400 which is slowly moved or retracted as the slurry 8 or suspension of the coating materials, e.g., zirconia or titania, is pumped through the walls of the porous tube. By varying the amount of material pumped through the porous walls of the tube along the length of the tube in this manner, a profiled change in the porosity of the tube may be achieved, with the portion of the tube 8A exposed the longest to the coating materials having the lowest porosity and, therefore, being located on the downstream end of the flow of Fluid B (or 7) through the tube.

The porosity of a porous metal substrate, such as a commercially available porous stainless steel tube, could also be modified by coating the porous tube with fine metal particles, and then sintering the coated tube at a temperature sufficiently low to permit the particles to sinter to the porous substrate without fusing the porous substrate into a non-porous mass. Examples of metal powders which may be used, for example, with a porous stainless steel tube include stainless steel, nickel, and chromium.

The porosity of the porous surface separating the first 3 and second reactants 4 will be selected to provide a volumetric flow rate of second reactant through the porous barrier which will result in the desired rate of reaction between the reactants. If the exothermic heat given off during the reaction is high, in accordance with the process of the invention, the reaction may be slowed by lowering the flow of the second reactant into the reaction zone. This may be accomplished, in accordance with the present invention, by selecting a barrier material having a lower porosity.

The viscosity of the reactant which is flowing through the porous barrier, as well as the pressure difference between the two sides of the porous barrier and the area of the porous barrier, also must be taken into account when attempting to adjust the volumetric flow of the second reactant across the porous barrier to thereby exercise control of the generation of exothermic heat in the reaction zone. This viscosity, if desired, may be further controlled or adjusted by blending product with the particular reactant before feeding the reactant into the reaction zone.

When these parameters are all taken into account, the porosity of a porous barrier of given area to a reactant of given viscosity at a given pressure differential across the barrier to achieve a particular volumetric flow rate may be expressed in the following equation:

$$V = \frac{Q * A * \Delta P}{\mu}$$

wherein:
V=volumetric flow rate of the reactant going through the porous barrier, in cubic centimeters per second (cc/sec);
A=the outside area of the porous barrier in square centimeters ($cm^2$);
$\mu$=the viscosity of the second reactant passing through the porous barrier in centipoise (cp);
ΔP=the change or difference in pressure from one side of the porous barrier to the other side in pounds per square inch (psi); and
Q=the viscosity normalized permeability of the porous barrier material in $cm^3$ $cp/cm^2$ sec psi (where 1 pound per square inch (psi) is equal to 6894.7 pascal).

It will, of course, be recognized that this "viscosity normalized permeability" of a given material will vary with the porosity of the material, the wall thickness of the porous barrier, and the wall morphology, since the porosity may not be uniform. In accordance with the invention, the Q value of the porous barrier initially used to separate the first and second reactants should range from about $10^{-6}$ to about $5 \times 10^{-2}$ $cm^3$ $cp/cm^2$ sec psi, preferably from about $10^{-6}$ to about $10^{-4}$ $cm^3$ $cp/cm^2$ sec psi, and most preferably from about $5 \times 10^{-6}$ to about $5 \times 10^{-5}$ $cm^3$ $cp/cm^2$ sec psi, to provide the desired initial separation while still permitting adequate permeance of the second reactant through the barrier to permit the reaction to proceed. The mean pore diameter of the pores in the barrier, depending upon its application, may generally range from between about 0.01 and 50 micrometer.

The temperature range maintained in the reactor 40 may range from the lowest temperature at which the particular second reactant 4 will still pass through the porous material, and at which both reactants (3 and 4) will be in either the gaseous or liquid states, i.e., will not become solidified. Apart from this, the low end of the temperature range maintained within the reactor will usually depend upon the desired process economics since some reactions will be unacceptably slow if the temperature is maintained too low.

The upper end of the temperature range maintained within the reactor will usually be from about 5° C. to about 200° C. below that temperature at which significant product degradation or undesirable side product formation occurs. By "significant" is meant 10% or more of the product degrades or 10% or more of the reaction product comprises the product of a side reaction.

Usually the temperature within the reactor will be within a range of from about −50° C. to about 500° C. (depending upon the particular reactants), preferably from about 0° C. to about 400° C. (again depending upon the particular reactants) and more preferably between about 110° and 400° C. (depending upon the particular reactants). For example, the reactor will be maintained within a range of from about 100° C. to about 200° C. for an ethoxylation reaction, while for a typical sulfonation process, the reactor temperature maintained within a range of from about −20° C. to about +100° C.

The outlet pressure of the reactor may be maintained at any conventional pressure used in state of the art reactors consistent with the minimum pressure needed to obtain sufficient desired product flow up to the maximum pressure which may be handled by downstream equipment, e.g., a high pressure needed to couple with downstream processing.

Inlet pressures of the reactants must be consistent with the desired outlet pressure and the pressure drop within the reactor. The differential in inlet pressure between the first and second reactants will be a function of the permeability of the second reactant—which will, in turn, be dependent upon the physical properties of the second reactant and the porosity of the porous material in the apparatus.

It should be noted that the pressure within the second reaction zone at all locations of the porous wall should be maintained higher than the pressure in the first reaction zone at corresponding locations of the porous wall, to thereby inhibit any flow through the porous wall from the first reaction zone to the second reaction zone.

Reactions and Reactants Used in the Process

There are many reactions which benefit from the application of this invention. By way of examples of reactions which may be carried out using the process and apparatus of the invention, and not by way of limitation, there may be mentioned oxidations, halogenations, sulfonations, sulfations, nitrations, ethoxylations, hydrogenations, polymerizations and the like. State of the art conditions for these reactions, therefore, extend over very broad ranges of temperature and pressure.

To practice the present invention with these conditions, one of skill in the art should select the conditions for the reaction first zone to be quite near those conditions used with state of the art reactors for the reactions considered. The advantage of using the present invention is less local temperature excursions within the reactor, and better control of the transport of reactants and products throughout the reaction zone and process yielding higher quality, and more uniform reaction products.

The respective flow rates of the reactants into the reactor will, of course, depend upon a number of parameters including those just discussed, as well as the overall size of the reactor. The relative rates of reactant flow, i.e., with respect to one another, will depend upon the particular reaction, including the amount of heat generated, as well as whether or not the process will be carried out in one or more stages.

It may be desirable, when the process is conducted in a single stage apparatus, to circulate some of the product stream back to the inlet side of either or both reactants in some instances to thereby provide a further control of the reaction rate or to alter the viscosity of one of the incoming reactant flows. In the case of the first reactant 3, such dilution will result in less reactant present per given mass and heat capacity of this total flow going into the zone 1 of the reactor. Thus, the total exothermic heat of the reactions of all of this first reactant mixture 3 will result in a lower final temperature because of the larger heat capacity. Addition of the product to the second reactant stream 4 will (in many cases) serve to increase the viscosity of the second reactant stream passing through the porous barrier, thus decreasing the volumetric flow rate of second reactant passing through the porous barrier (in accordance with the previous equation) which will also serve to slow down the reaction and reduce the generation of exothermic heat.

Multiple Stage Apparatus for Conducting the Process

The preferred mode of operating the process of the invention will be in a plurality of stages, using, for example, in each stage, a shell and tube reactor such as previously described and illustrated in FIGS. 2 and 3, together with optional recirculation of product, optional addition of makeup reactants, and optional use of heat exchangers to control the overall temperature buildup as needed.

Such apparatus is illustrated in block diagram form in FIG. 4 which illustrates three stages of operation of the process of the invention. The first reactant from source 70 travels via conduit 72 through valve 74 and pump 76 to an optional mixer 78 where the first reactant stream 3 may be optionally blended with a portion of the product stream from first reactor 100. The first reactant 3 then travels via conduit 79 into first reactor 100, which may be a shell and tube reactor similar to reactor 40 previously depicted in FIGS. 2 and 3. In this case, conduit 79 would be connected to inlet manifold 44 (FIG. 2) within reactor 100 so that the first reactant 3 flows through the tubes containing mixing elements within reactor 100 connected to inlet manifold 44.

The second reactant 4, from second reactant source 80, passes via conduit 82 through valve 83 and then through conduit 84 to optional blender 89 and then through conduit 85 to enter the shell portion of first reactor 100. As previously described with respect to FIGS. 2 and 3, the second reactant 4 then passes from the shell through the porous portions of the tubes within reactor 100 to react with the first reactant 3 flowing through the tubes.

The resulting product 5, as well as any unreacted reactant (s), leave first reactor 100 via conduit 86, where the product stream splits into two streams. Conduit 87a optionally returns some of the product stream through valve 88a to optional blender 89 where it is blended with the second reactant stream and is then fed via conduit 85 into reactor 100. The remainder of the product stream passes through conduit 87b to valve 88b and then through heat exchanger 81 and conduit 90. Conduit 90 then also splits into two portions. Conduit 92 passes a portion of the product stream to the next stage, and conduit 94 through which one may optionally recirculate product 5 back to reactor 100.

The portion of the product stream optionally recycled back to reactor 100 through conduit 94 passes through a valve 95 (which controls the ratio of product stream being recycled back to reactor 100) to pump 96 which is connected to mixer 78 via conduit 98.

By shutting off both valves 88a and 95, all of the product stream will be passed on to the subsequent stage of the apparatus. Shutting off only one of valves 88a or 95 will respectively recycle the product stream back to only one of the initial reactant streams as desired.

Similarly, the relative flows of the first and second reactants into reactor 100 may be controlled by adjustment of valves 74 and 83, as well as valve 88b, either by itself (when valve 88a is shut off) or in conjunction with valve 88a, to control the flow rate through reactor 100.

The portion of the product stream to be passed on to the next stage via line 92 passes through pump 176 to optional mixer 178 where it is optionally blended with recycled product from the second stage as well as with an optional flow of further first reactant from first reactant source 70 via line 172 and valve 174, which controls the amount of fresh first reactant to be blended with the product stream from reactor 100.

The product stream from reactor 100, with or without further amounts of fresh first reactant and recycled product from the second stage, is fed into second reactor 200 via line 179. As previously described with respect to reactor 100, second reactor 200 would preferably be constructed similarly to reactor 40 illustrated in FIGS. 2 and 3, so the incoming stream from line 179 would pass into the interior of the porous tubes of the reactor via the inlet manifold.

Optional additional second reactant would then flow, via line 182 and valve 183 from second reactant source 80 to an optional blender 189 from which it would flow via conduit 185 to the shell side of reactor 200.

The product stream, emerging from reactor 200 via conduit 186, is split into two streams (as in the first stage). One stream which will flow via conduit 187a through valve 188a to optional blender 189 where it can be blended with fresh second reactant. The other stream will flow via conduit 187b to valve 188b and heat exchanger 181. The stream then flows via conduit 190 to a point where it again may be split between two streams to either pass on to the third stage via conduit 192 or to recirculate via conduit 194 and valve 195 back through pump 196 and conduit 198 to optional blender 178 where the product stream may be blended with fresh first reactant 3.

Similarly, in the third stage, the product stream in conduit 192 may be pumped through pump 276 to optional blender 278 where it may be optionally blended with fresh first reactant 3 entering blender 278 from source 70 via conduit 272 and valve 274, as well as with recycled product from reactor 300, as will be described below, before entering reactor 300 via conduit 279. Reactor 300 is also preferably be constructed in accordance with the previously described construction with respect to FIGS. 2 and 3. Thus, the incoming stream via conduit 279 enters the inlet manifold to be distributed to the porous tubes within reactor 300.

Optional additional second reactant 4 would then flow, via line 282 and valve 283 from second reactant source 80 to optional blender 289 from which it would flow via conduit 285 to the shell side of reactor 300.

The product stream, emerging from reactor 300 via conduit 286, is then split into two streams (as in the first and second stages). One stream which will flow via conduit 287a through valve 288a to optional blender 289 where it can be blended with fresh second reactant. The other stream will flow via conduit 287b to valve 288b and heat exchanger 281. It then flows by way of conduit 290 to a point where it again may be split between two streams to either pass on to the product collection point 350 via conduit 292 or to recirculate via conduit 294 and valve 295 back through pump 296 and conduit 298 to optional blender 278 where the product stream may be again blended with fresh first reactant 3.

It should be noted that while the above description of a multiple stage apparatus includes descriptions of valves and conduits which make possible the recycling of portions of the product flow back to each reactor stage and which also make possible the blending of fresh first or second reactants at every stage, these options will rarely all be exercised simultaneously. Thus, it may be possible that no product will be recycled and no fresh first or second reactants added, with the subsequent stages merely acting as an extension of the reaction zone of the first stage. Alternatively, when stoichiometric equivalents of both reactants have been initially fed into the first stage, only the recycling of product may be carried out, without any additional amounts of either reactant added to the streams entering the subsequent stages of the apparatus. Finally, if a stoichiometric excess of one of the reactants is initially fed into the first stage, only significant amounts of the other reactant may be blended with the inlet streams to subsequent stages. However, even in such circumstances, it may be necessary to add to subsequent stages minor increments of even the reactant initially added in stoichiometric excess to the first stage.

As shown in the dotted lines in FIG. 4, connected respectively to reactors 100, 200, and 300, optional heat exchanger loops, each comprising a heat exchanger 316, and a pump 320, may be connected to one or more of the reactors to remove exothermic heat generated in any or all of the reactors as needed.

In the sulfonation of the methyl laurate (or other alkyl long chain esters), the sulfur trioxide to methyl laurate feed ratio is between about 0.8 and 1.2 (preferably 1.05). The sulfonation reactor outlet temperature is between about 60 and 100° C. (preferably about 74–75° C.). The sulfonation pressure of the inlet is between about 250 and 350 psia ($1.7 \times 10^6$ and $2.4 \times 10^6$ pascal) preferably about 300–306 psia (about 2.1 and $10^6$ pascal). The outlet pressure is between about 50 and 100 psia ($3.4 \times 10$ and $6.9 \times 10^4$ pascal), preferably about 65 psia ($4.4 \times 10^4$ pascal). The residence time in the reactor is between about 1 and 4 sec. (preferably about 2.3 sec.). The conversion of methyl laurate is high, generally between about 90–99% (usually about 97–98%). The selectivity to produce alpha-sulfomethyl laurate is high, generally between about 90 and 99% (usually about 95–96%).

In one embodiment, a reactor of the present invention has an overall shell size of about 40–60 in (100–150 cm) in length, preferably about 45 in (114 cm), and a diameter of about 15–25 in (38–63 cm), preferably 19–20 in (48–51 cm). The number of porous tubes is between about 150 and 220 (preferably about 189–190). The porous tubes have between about 0.6–2.54 cm inside diameter (I.D.) (preferably about 1.6 cm) and an outside diameter (O.D.) of between about 1.27 and 3.8 cm, preferably about 2.2 cm. The reactor has between about 75 and 125 cm of active length, preferably about 100 cm. The mixing elements and mixing balls having a diameter of between about 0.5 and 0.1 cm, preferably about 0.25 cm.

Pulsatile Flow

In one embodiment referring to FIGS. 1 and 3, the exothermic reactor process uses, with the first reactant 3, a slurry of a catalyst 12A in reactor 10. The flow of catalyst slurry 12A with the mixing elements 12 occurs such that the flow rate of the first reactant 3 changes as a function of time. This flow rate change may be referred to as pulsatile (or pulsed) flow e.g. a sine wave, square wave, irregular wave, etc. The pulsed flow prevents the accumulation of solid catalyst particles 12A at fixed points on the mixing elements 12. This accumulation of catalyst particles 12A is not desired because it changes the flow characteristics in mixing in the reaction zone and may ultimately block the flow of catalyst or reactant or both.

Preferably, the pulsed flow changes with time in a cyclic manner. For instance, the rate of flow of catalyst slurry may change in the cycle from maximum flow to a level of about 80% of the maximum rate of flow. Preferably, the rate of flow of catalyst slurry cycles down to a level of about 50% of the maximum rate of flow of the catalyst slurry, then returns to the maximum flow rate. Preferably, the rate of flow of catalyst slurry cycles down to a level of about 20% in the reverse direction of the maximum rate of flow of the catalyst 12A, then returns to about the maximum flow rate in the original direction of flow.

In the pulsed flow, a typical example is the reaction of hydrogen with an alkene using a flowing slurry of Raney nickel catalyst particles suspended in the alkane. The maximum rate of flow of the reactant suspended catalyst corresponds to residence times of between about 0.5 to 6000 sec. The flow rate can change to achieve a rate of flow of between about 80% and −20% ml/sec. of maximum. After remaining at this reduced flow rate (about 50% of maximum) for between about 0.1 and 1000 sec, the rate of flow is increased back to the maximum flow rate.

Separation (e.g., Evaporation) of Reaction Products

In one embodiment, the present invention is improved by removal of volatile reaction products. The volatile reaction products or reactants are those having a vapor pressure of about 1 mm of Hg or higher at the reaction temperature of the reaction of step (c). Referring now to FIGS. 2 and 8, reactor 40 is one having a shell 60 and having multi tube porous barrier reactors 50. The second reactant 4 enters through inlet 62 via line 62A and is forced under pressure from the shell side through the porous barrier 52 into a recirculation stream of product 48A. The second reactant can be removed or recycled via line 64A at outlet 64. The first reactant is introduced to the reactor 60 via inlet 42 via line 42A in a continuous (or a pulsed) stream in the tube side of the reactor. A recycle loop of lines 48A and 48B, evaporator 500, and line 48D has a flash evaporator 500 to remove the volatile products of the reaction. The reaction products (or multiple components) is conveyed from outlet 48 via line 48A and 48B to an optional cooler 501 and then as a liquid via line 48B to the evaporator 500. The volatile reaction products are removed as a vapor via line 48C. The liquid product is conveyed via line 48D to line 42A, and then is recycled through the primary reactor 40. In effect, a steady state loop is created for maximum heat removal. The volatile reaction products are removed which prevents their further reaction and the formation of undesirable side products, and usually permits the operation of the primary reactor at higher temperatures, as compared to the system which does not have the evaporator, e.g. from about 5° C. up to about 200° C. higher than the reaction systems not having the evaporator.

The fields of use for the present invention include, but are not limited to, formation of a pesticide, a fungicide, a rodenticide, an insecticide, a herbicide, a pharmaceutical, a surfactant, a demulsifying agent, a fabric treatment agent, a hydrocarbon solvent, a hydrocarbon fuel, an organic polymer, a synthetic lubricant, a halogenated hydrocarbon, a fire retardant and the like.

Surfactants which are prepared according to the present invention, include but are not limited to, alkyl benzene sulfonates, linear alkylbenzene sulfonates, secondary alkane sulfonates, alpha olefin sulfonates, alkyl glyceryl ether sulfonates, methyl ester sulfonates, natural fat sulfonates, alcohol sulfates, alcohol ether sulfates and the like.

The following examples serve to further explain and describe the present invention. They are not to be construed to be limiting in any way.

EXAMPLE I

Ester Sulfonation ($SO_3$ High Flow Rate)

(a) Fresh methyl laurate, having a viscosity of 2 cp, may be fed at a rate of 550 grams/sec into a mixer where it is mixed with a 5650 grams/sec flow of recycled product and the resulting mixture is fed, at a temperature of about 38° C. (~100° F.) and a pressure of about 340 psia ($2.3 \times 10^6$ pascal (where 1 psia-6894.7 pascal)) into the top of 85 porous wall tubes arranged vertically in a bundle in a cylindrical reactor having an inside diameter (ID) of about 20 in. (50.8 cm). Each tube has an ID of about ¾" (1.91 cm), and has a 110 cm. length of porous metal comprising stain-less steel fabricated by powder metallurgy to have a nominal pore size of generally about 0.2 microns (μmeters) and a viscosity normalized permeance of about 0.0037 $cm^3$ $cp/cm^2$ sec psi.

The tubes are each packed with inert glass balls, each having a diameter of 0.320 cm., up to a distance of 10 cm. above the porous portion of each tube and also extending to the bottom of each tube, i.e., beyond the porous portion of the tube in the direction of reactant flow.

On the shell side of the reactor, 205 grams/second of liquid $SO_3$ may be mixed with a 760 grams/sec flow of recycled product at a temperature of about 38° C. (~100° F.) and a pressure of about 350 psia ($2.4 \times 10^6$ pascal) and fed into the shell portion of the reactor to pass through the porous tubes and react with the methyl laurate therein.

The resulting product stream, leaving the reactor at a temperature of about 74° C. (~165° F.) and a pressure of about 65 psia ($4.5 \times 10^5$ pascal), is fed through a heat exchanger containing 1350 tubes having an ID of 1.91 cm and 240 cm in length, and also packed with 0.32 cm diameter inert glass balls.

The sulfonated methyl laurate product from such a reactor system will be uniform and low in unwanted products and substantially higher in quality than that obtained from state of the art reactor technology. This is because there is no temperature peak typical of the entry region of a falling film reactor and because there is even distribution of reactant all along the reactor length in the process of the invention.

(b) Similarly, the reaction described in Example 1(a) above is repeated except that the methyl laurate is replaced by a stoichiometrically equivalent amount of linear alkylbenzene, the corresponding linear alkylbenzene-sulfonic acid is obtained. These are useful as surfactants.

(c) Similarly, the reaction described in Example I(a) above is repeated except that the methyl laurate is replaced by a stoichiometrically equivalent amount of phenol, and the corresponding mixture of hydroxybenzenesulfonic acids are obtained.

EXAMPLE II

Ester Sulfonation ($SO_3$ Lower Flow Rate)

(a) Fresh methyl laurate, having a viscosity of 2 cp, may be fed at a rate of 550 grams/second into a mixer where it is mixed with a 6400 grams/sec flow of recycled product and the resulting mixture is fed, at a temperature of about 38° C. (~100° F.) and a pressure of about 265 psia ($1.8 \times 10^6$ pascal) into the top of 125 porous wall tubes arranged vertically in a bundle in a cylindrical reactor having an ID of about 20 inches. Each tube has an ID of about ¾" (1.91 cm), and has a 110 cm. length of porous metal comprising stainless steel fabricated by powder metallurgy and coated with zirconia to have a viscosity normalized permeance of about $1.2 \times 10^{-5}$ $cm^3$ $cp/cm^2$ sec psi.

The tubes are each packed with inert glass balls, having a diameter of 0.320 cm., up to a distance of 10 cm. above the porous portion of each tube and also extending to the bottom of each tube, i.e., beyond the porous portion of the tube in the direction of reactant flow.

On the shell side of the reactor, liquid $SO_3$ may be introduced into the reactor, without mixing with recycled product, at a flow rate of about 205 grams/sec flow, and at a temperature of about 38° C. (~100° F.), and a pressure of about 350 psia ($2.4 \times 10^6$ pascal) to pass through the porous tubes and react with the methyl laurate therein.

The resulting product stream leaving the reactor at a temperature of about 74° C. (~165° F.) and a pressure of about 65 psia ($4.5 \times 10^5$ pascal) is fed through a heat exchanger similar to that described in Example I. The resulting sulfonated methyl laurate product will again be uniform and low in unwanted products and substantially higher in quality than that obtained from state of the art reactor technology.

(b) Similarly, the reaction described in Example II(a) above is repeated except that the methyl laurate is replaced by a stoichiometrically equivalent amount of linear alkylbenzene, the corresponding linear alkylbenzene-sulfonic acid is obtained.

(c) Similarly, the reaction described in Example II(a) above is repeated except that the methyl laurate is replaced by a stoichiometrically equivalent amount of phenol, and the corresponding mixture of hydroxybenzenesulfonic acids are obtained.

EXAMPLE III

Ester Sulfonation, Multiple Stages (a) To illustrate the use of multiple stages of the process of the invention, when products with particularly low levels of impurities are desired, three shell and tube reactors similar to those used in Examples I and II may be used. The porous wall portion of each tube would be 110 cm in length and the inner diameter of each would be 1.91 cm (¾"). The porous portion of each tube may be fabricated from a stainless steel powder metallurgy and coated with zirconia to provide a viscosity normalized permeance of $1.2 \times 10^{-5}$ cm$^3$ cp/cm$^2$ sec psi and each tube could be filled with 0.32 cm diameter inert glass balls to 10 cm above and below the porous portion of the tube. In each reactor, the tubes would be located in a 50.8 cm (20 in) diameter shell. Each reactor may be connected to a heat exchanger having tubes with a diameter of 1.91 cm ID filled with the same inert 0.32 cm diameter spherical glass mixing elements used in the reactors. The length of the tubes could be varied for different stages.

In the first stage, a 550 grams/sec flow of fresh methyl laurate may be mixed with 2900 grams/sec of cooled recycled product from the first stage and introduced into a 46 tube reactor first stage at a temperature of 38° C. (100° F.) and a pressure of 155 psia ($1.1 \times 10^6$ pascal).

About 50% (103 grams/sec) of the total $SO_3$ is introduced as a liquid into the shell side of the first stage reactor at 350 psia and a temperature of 38° C. The resultant product flow, having a temperature of about 74° C. (165° F.) and a pressure of 65 psia ($4.5 \times 10^5$ pascal), is fed into a heat exchange containing 45 of the 0.6 meter long tubes filled with mixing elements.

From the output of the first stage heat exchanger, 655 grams/sec is mixed with 1775 grams/sec of cooled product stream from the second stage and fed into 36 tubes comprising the second stage reactor at a temperature of 38° C. (100° F.) and 200 psia ($1.4 \times 10^6$ pascal). The other 2900 grams/sec of cooled product from the first stage may be recycled back to the first stage reactor as described above.

About 35% (72 grams/sec) of the total amount of $SO_3$ is introduced as a liquid into the shell side of the second stage reactor at 350 psia ($2.4 \times 10^6$ pascal) which will result in a product flow exiting the second stage reactor at 65 psia ($4.5 \times 10^5$ pascal) and a temperature of 74° C. (165° F.). This product flow is then cooled by feeding it into 115 1.3 meter long mixing element-filled tubes in the second stage heat exchanger.

From the second stage recirculating loop downstream of the second stage heat exchanger, 725 grams/sec of product flow is mixed with 320 grams/sec of cooled product from the third stage and introduced into the 19 tube third stage reactor at a temperature of 38° C. (100° F.) and a pressure of 265 psia ($1.8 \times 10^6$ pascal). In this stage the remaining 15% of the $SO_3$ is introduced at a temperature of 38° C. and a pressure of 115 psia ($1.1 \times 10^6$ pascal).

The product flow from the third stage reactor tubes leaves the reactor at 65 psia and 74° C. (165° F.) and enters a heat exchanger containing 200 of the 2.3 meter tubes which are also filled with mixing elements. From the recirculating loop coming from this third heat exchanger, 760 grams/sec of product are withdrawn, while the remaining 320 grams/sec of cooled product are recycled as previously described.

The resulting sulfonated methyl laurate product will again be uniform and low in unwanted products and substantially higher in quality than that obtained from state of the art reactor technology.

(b) Similarly, the reaction described in Example III(a) above is repeated except that the methyl laurate is replaced by a stoichiometrically equivalent amount of linear alkylbenzene, the corresponding linear alkyibenzene-sulfonic acid is obtained.

(c) Similarly, the reaction described in Example III(a) above is repeated except that the methyl laurate is replaced by a stoichiometrically equivalent amount of phenol, and the corresponding mixture of hydroxybenzenesulfonic acids are obtained.

EXAMPLE IV

Ester Sulfonation, Small Temperature Increase (a) To illustrate a modification of the process of the invention, where all of the $SO_3$ is introduced in one stage with a very low rise in temperature because of the high recycle rate, and a second stage is provided operating at a substantially higher temperature to allow any rearrangement of $SO_3$ among the molecules in the product from the first reactor stage, methyl laurate may be introduced into a reactor containing 200 tubes, each having the same dimensions and viscosity normalized permeance as in Example II.

The flow rate of fresh methyl laurate is also the same as in Example II, i.e, 550 grams/sec, but the amount of recycled product blended with the methyl laurate prior to introduction into the tubes is 10,750 grams/second, i.e., much higher than Example II, resulting in more thermal mass and, therefore, a commensurate reduction in the temperature rise from the fixed exothermic heat generated. The combined stream enters the tubes of the reactor at 38° C. (100° F.) and 285 psia ($1.96 \times 10^6$ pascal).

On the shell side of the reactor a stream of 205 grams of liquid $SO_3$ is introduced into the reactor at a temperature of 38° C. (100° F.) and a pressure of 290 psia ($2.0 \times 10^6$ pascal).

The product flow exiting the reactor then is circulated through the same mixing element-filled heat exchanger as in Example I and a product flow of about 760 grams/sec is withdrawn from output of the heat exchanger (with the balance recycled back to the reactor), mixed with a flow of about 6000 grams/sec of recycled product from a mixing tank, and pumped to the tube side of a heat exchanger where it is heated to have an exit temperature of 82° C. (180° F.). This flow goes to the mixing tank which is sized to have a residence time of about 15 minutes. This time at elevated temperature allows any rearrangement of the materials in the product to closely approach equilibrium. The product is continuously withdrawn from the mixing tank at 760 grams/sec and cooled for storage or use.

In this regard, it should be noted that such a mixing tank is filled with the product from the last operation. The first time the apparatus is started, the tank is filled from the low temperature reactor. The mixing tank can have any type of stirring or agitation means within it, including mixing elements. For example, some molecules could contain two attached $SO_3$ groups and other molecules have no $SO_3$ groups attached. The breaking of a $SO_3$ group away from a molecule with two such groups and the combination of an $SO_3$ group with a molecule without an $SO_3$ group on it would not generate substantial net heat in the mixing tank.

Again, the resulting product will be uniform and low in unwanted products and substantially higher in quality than that obtained from state of the art reactor technology.

(b) Similarly, the reaction described in Example IV(a) above is repeated except that the methyl laurate is replaced by a stoichiometrically equivalent amount of linear alkylbenzene the corresponding linear alkylbenzenesulfonic acid is obtained.

(c) Similarly, when the reaction described above in Example IV(a) is repeated except that the methyl laurate is replaced by a stoichiometrically equivalent amount of phenol, the corresponding mixture of hydroxybenzenesulfonic acids are obtained.

EXAMPLE V

Alcohol and Ethylene Oxide (a) Fresh tridecyl alcohol, having a viscosity of 1 cp, may be fed at a rate of 270 grams/second into a mixer where it is mixed with a 12,300 grams/sec flow of recycled product and the resulting mixture is fed, at a temperature of about 121° C. (~250° F.) and a pressure of about 80 psia ($5.5 \times 10^5$ pascal) into the top of 585 porous wall tubes arranged vertically in a bundle in a cylindrical reactor having an ID of about 30 inches. Each tube has an ID of about 5/8" (1.59 cm), and has a 100 cm. length of porous metal comprising stainless steel fabricated by powder metallurgy and coated with zirconia to have a viscosity normalized permeance of about $1.2 \times 10^{-5}$ cm$^3$ cp/cm$^2$ sec psi.

The tubes are each packed with inert glass balls, having a diameter of 0.265 cm., up to a distance of 10 cm. above the porous portion of each tube and also extending to the bottom of each tube, i.e., beyond the porous portion of the tube in the direction of reactant flow.

On the shell side of the reactor, gaseous ethylene oxide may be introduced into the reactor, without mixing with recycled product, at a flow rate of about 532 grams/sec flow, and at a temperature of about 121° C. (~250° F.), and a pressure of about 250 psia ($1.7 \times 10^6$ pascal) to pass through the porous tubes and react with the tridecyl alcohol therein.

The resulting product stream leaving the reactor at a temperature of about 199° C. (~300° F.) and a pressure of about 65 psia ($4.5 \times 10^5$ pascal) is fed through a heat exchanger similar to that described in Example I. The resulting ethoxylated tridecyl alcohol product will have a very unitary product distribution and be low in unwanted products and substantially higher in quality than that obtained from state of the art reactor technology.

Thus, the present invention provides a process for carrying out a process wherein the flow of second reactant into the reaction zone is controlled, to thereby control the reaction and the amount of heat generated, by the use of a porous barrier which restricts the amount of second reactant flowing across the porous barrier into the reaction zone. Such control of the reaction and control of heat, while providing adequate mixing of the reactants in the reaction zone to ensure homogeneous reaction and heat generation in the reaction zone, results in a product which, as mentioned above in the examples, is uniform and low in unwanted products and substantially higher in quality than that obtained from state of the art reactor technology.

While the present invention has been described with reference to the specific embodiments thereof, it should be understood by those skilled in the art of chemical processing and control of reaction in a reaction zone by use of a porous barrier between a first reactant and a second reactant having mixing elements in the reaction zone as described herein. The use of a porous barrier and mixing elements in chemical processing applications is such that various changes may be made and equivalents may be substituted without departing from the true spirit and scope of the present invention. In addition, many modifications may be made to adapt a particular situation, material, or composition of matter, process, process step or steps, or the present objective to the spirit and scope of this invention, without departing from its essential teachings.

We claim:

1. A process for forming a reaction product fluid by reaction of one or more first reactants and one or more second reactants, which process comprises:

(a) feeding into a first reactor zone having mixing elements therein said one or more first reactants at a first pressure;

(b) feeding one or more of said second reactants at a second pressure higher than said first pressure into a second reactor zone separated from said first reactor zone by a porous wall capable of being penetrated by said second reactant; and (c) maintaining the pressure within said second reaction zone higher than the pressure in said first reaction zone at said porous wall, to thereby inhibit any flow of said one or more first reactants, said one or more second reactants, said reaction product fluid or combinations thereof in said first reactor zone through said porous wall from said first reaction zone to said second reaction zone;

whereby said one or more second reactants will pass through said porous wall to contact said one or more first reactants in said first reactor zone and form said reaction product fluid comprising a liquid, a gas or combinations thereof.

2. The process of claim 1 wherein said porous wall through which said one or more second reactants passes into said first reactor zone has a viscosity normalized permeability ranging from about $10^{-6}$ to about $5 \times 10^{-2}$ cm$^3$ cp/cm$^2$ sec psi.

3. The process of claim 1 wherein a portion of the product flow from said reactor is recycled back and blended with said one or more first reactants being fed into said first reactor zone.

4. The process of claim 3 wherein said product flow from said reactor is first passed through a heat exchanger before said portion of said product flow is recycled back and blended with said one or more first reactants being fed into said first reactor zone.

5. The process of claim 1 wherein a portion of the product flow from said reactor is recycled back and blended with said one or more second reactants being fed into said second reactor zone.

6. The process of claim 5 wherein said product flow from said reactor is first passed through a heat exchanger before said portion of said product flow is recycled back and blended with said one or more second reactants being fed into said second reactor zone.

7. A process for forming a reaction product fluid by reaction of one or more first reactants and one or more second reactants, which process comprises:

(a) feeding into a first reactor zone having mixing elements therein said one or more first reactants at a first pressure;

(b) feeding one or more of said second reactants at a second pressure higher than said first pressure into a second reactor zone separated from said first reactor zone by a porous wall capable of being penetrated by said second reactant; and (c) maintaining the pressure within said second reaction zone at all locations of said porous wall higher than the pressure in said first reaction zone, to thereby inhibit any flow of said one or more first reactants, said one or more second reactants, said reaction product fluid or combinations thereof in said first reactor zone through said porous wall from said first reaction zone to said second reaction zone;

whereby said one or more second reactants will pass through said porous wall to contact said one or more first reactants in said first reactor zone and form said reaction product fluid comprising a liquid, a gas or combinations thereof, wherein at least one of said reactants is a liquid.

8. The process of claim 7 wherein at least one of said one or more said first reactants is a liquid.

9. The process of claim 7 wherein at least one of said one or more second reactants is a liquid.

10. A process for forming a reaction product fluid by reaction of one or more first reactants and one or more second reactants, which process comprises:

(a) feeding into a first reactor zone having mixing elements therein said one or more first reactants at a first pressure;

(b) feeding one or more of said second reactants at a second pressure higher than said first pressure into a second reactor zone separated from said first reactor zone by a porous wall capable of being penetrated by said second reactant; and (c) maintaining the pressure within said second reaction zone at all locations of said porous wall higher than the pressure in said first reaction zone, to thereby inhibit any flow of said one or more first reactants, said one or more second reactants, said reaction product fluid or combinations thereof in said first reactor zone through said porous wall from said first reaction zone to said second reaction zone;

whereby said one or more second reactants will pass through said porous wall to contact said one or more first reactants in said first reactor zone and form said reaction product fluid comprising a liquid, a gas or combinations thereof;

wherein at least one of said one or more first reactants is a liquid and at least one of said one or more second reactants is a liquid.

11. The process of claim 1 wherein the temperature of each of said reactants being fed into the respective reaction zones is within a range of from about −50° C. to about 500° C.

12. The process of claim 1 wherein the pressure of each of said first reactants and said second reactants being fed into the respective reaction zones is within a range of from about 14 psia to about 1000 psia, with the pressure of said one or more second reactants being greater than the pressure of said one or more first reactants.

13. The process of claim 1 wherein all or a portion of said product is recycled back to said first reactor zone.

14. The process of claim 13 wherein all or a portion of said product is cooled and then recycled back to said first reactor zone.

15. The process of claim 1 wherein said porous wall comprises one or more porous tubes which separate said first reactor zone from said second reactor zone.

16. The process of claim 1 wherein the process is selected from the group consisting of oxidation, sulfonation, hydrogenation, halogenation, ethoxylation, sulfation, nitration, and polymerization.

17. The process of claim 1 wherein the flow of the first reactant is pulsed.

18. The process of claim 1 wherein the process further includes step (d), (e) and (f);

(d) conveying a portion of the reaction product fluid of step (c) to an evaporator;

(e) separating volatile reactants or volatile reaction products wherein the vapor pressure of the volatile reactants or reaction products is about 1 mm of Hg or higher at the temperature of the reaction in step (c) creating a reaction product liquid; and (f) optionally recycling all or a portion of the reaction product liquid now depleted of volatile reactants, volatile reaction products or a combination thereof to the first reactor zone of step (a).

19. A process for forming a reaction product fluid by reaction of one or more first reactants and one or more second reactants, which process comprises:

(a) feeding into a first reactor zone containing mixing elements therein one or more first reactants at a first pressure;

(b) feeding one or more second reactants at a second pressure higher than said first pressure into a second reactor zone separated from said first reactor zone by a porous wall capable of being penetrated by said one or more second reactants; and (c) maintaining the pressure within said second reaction zone at all locations of said porous wall higher than the pressure in said first reaction zone to thereby inhibit any flow of said one or more first reactants, said one or more second reactants, said reaction product fluid or combinations thereof in said first reactor zone through said porous wall from said first reaction zone to said second reaction zone;

whereby said one or more second reactants will pass through said porous wall to contact said one or more first reactants in said first reactor zone and form said reaction product fluid having mixing elements therein.

20. The process of claim 19 wherein said mixing elements in said first reactor zone have at least one dimension equal to from about ½ to about 1/100 of the largest cross sectional dimension of said first reactor zone measured in the direction which is perpendicular to the flow of said one or more first reactants through said first reactor zone.

21. The process of claim 20 wherein said mixing elements in said first reactor zone have at least one dimension equal to from about ⅓ to about 1/10 of the largest cross sectional dimension of said first reactor zone measured in the direction which is perpendicular to the flow of said one or more first reactants through said first reactor zone.

22. The process of claim 19 wherein said porous wall comprises one or more porous tubes which separate said first reactor zone from said second reactor zone.

23. The process of claim 19 wherein the process further includes step (d), (e) and (f);

(d) conveying a portion of the reaction product fluid of step (c) to an evaporator;

(e) separating volatile reactants or volatile reaction products wherein the vapor pressure of the volatile reactants or volatile reaction products is about 1 mm of Hg or higher at the temperature of the reaction in step (c) producing a reaction product liquid; and (f) optionally recycling all or a portion of the reaction product liquid now depleted of volatile reactants, volatile reaction products or a combination thereof to the first reactor zone of step (a).

24. An exothermic process for forming a reaction product fluid by reaction of one or more first liquid reactants with one or more second liquid reactants, which process comprises:
(a) feeding one or more first liquid reactants at a first pressure through a first reactor zone having mixing elements therein;
(b) feeding one or more second liquid reactants at a second pressure higher than said first pressure into a second reactor zone separated from said first reactor zone by a porous wall capable of being penetrated by said one or more second liquid reactants; and
(c) maintaining the pressure within said second reaction zone at all locations of said porous wall higher than the pressure in said first reaction zone, to thereby inhibit any flow of said one or more first reactants, said one or more second reactants, said reaction product fluid or combinations thereof in said first reactor zone through said porous wall from said first reaction zone to said second reaction zone;

whereby said one or more second liquid reactants will pass through said porous wall to contact said one or more first liquid reactants in said first reactor zone and form said reaction product fluid having mixing elements therein.

25. The process of claim 24 wherein the process further includes step (d), (e) and (f);
(d) conveying a portion of the reaction product fluid of step (c) to an evaporator;
(e) separating volatile reactants or reaction products wherein the vapor pressure of the volatile reactants or volatile reaction products is about 1 mm of Hg or higher at the temperature of the reaction in step (c) producing a reaction product liquid; and
(f) optionally recycling all or a portion of the reaction product liquid now depleted of volatile reactants, volatile reaction products or a combination thereof to the first reactor zone of step (a).

26. The process of claim 24 wherein said mixing elements in said first reactor zone have at least one dimension equal to from about ½ to about 1/100 of the largest cross sectional dimension of said first reactor zone measured in the direction which is perpendicular to the flow of said one or more first reactants through said first reactor zone.

27. An exothermic process for forming a reaction product fluid by reaction of one or more liquid first reactants with one or more second reactants, at least one of which is gaseous at standard temperature and pressure, which process comprises:
(a) feeding said one or more liquid first reactants at a first pressure through a first reactor zone having mixing elements therein;
(b) feeding said one or more second reactant, at least one of which is gaseous at ambient conditions, at a second pressure higher than said first pressure into a second reactor zone separated from said first reactor zone by a porous wall capable of being penetrated by said one or more second reactants; and
(c) maintaining the pressure within said second reaction zone at all locations of said porous wall higher than the pressure in said first reaction zone, to thereby inhibit any flow of said one or more first reactants, said one or more second reactants, said reaction product fluid or combinations thereof in said first reactor zone through said porous wall from said first reaction zone to said second reaction zone;

whereby said one or more second reactants will pass through said porous wall to contact said one or more liquid first reactants in said first reactor zone and form said reaction product fluid having mixing elements therein.

28. The process of claim 27 wherein said mixing elements in said first reactor zone have at least one dimension equal to from about ½ to about 1/100 of the largest cross sectional dimension of said first reactor zone measured in the direction which is perpendicular to the flow of said one or more liquid first reactants through said first reactor zone.

29. The process of claim 27 wherein the process further includes step (d), (e) and (f);
(d) conveying a portion of the reaction product of step (c) to an evaporator;
(e) separating volatile reactants or volatile reaction products wherein the vapor pressure of the volatile reactants or volatile reaction products is about 1 mm of Hg or higher at the temperature of the reaction in step (c) producing a reaction product fluid; and
(f) optionally recycling all or a portion of the reaction product liquid now depleted of volatile reactants, volatile reaction products or a combination thereof to the first reactor zone of step (a).

30. The process of claim 27 wherein said porous wall through which said one or more second reactants pass into said first reactor zone has a viscosity normalized permeability ranging from about $10^{-6}$ to about $5 \times 10^{-2}$ cm$^3$ cp/cm$^2$ sec psi.

31. The process of claim 30 wherein said porous wall comprises one or more porous tubes which separate said first reactor zone from said second reactor zone.

32. An exothermic process for forming a reaction product fluid by reaction of one or more first reactants and one or more second reactants which comprises:
(a) feeding a first reactant at a first pressure through a first reactor zone containing mixing elements having at least one dimension equal to from about ½ to about 1/100 of the largest dimension of said first reactor zone measured in the direction which is perpendicular to the flow of said first reactant through said first reactor zone;
(b) feeding a second reactant at a second pressure higher than said first pressure into a second reactor zone separated from said first reactor zone by a porous wall capable of being penetrated by said second reactant; and
(c) maintaining the pressure within said second reaction zone at all locations of said porous wall higher than the pressure in said first reaction zone, to thereby inhibit any flow of said one or more first reactants, said one or more second reactants, said reaction product fluid or combinations thereof in said first reactor zone through said porous wall from said first reaction zone to said second reaction zone;

whereby said second reactant will pass through said porous wall to contact said first reactant in said first reactor zone and form said reaction product fluid.

33. The process of claim 32 wherein at least one of said reactants is a liquid.

34. The process of claim 32 wherein said porous wall through which said second reactant passes into said first reactor zone has a viscosity normalized permeability ranging from about $10^{-6}$ to about $10^{-4}$ cm$^3$ cp/cm$^2$ sec psi.

35. The process of claim 32 wherein the process further includes step (d), (e) and (f);
(d) conveying a portion of the reaction product of step (c) to an evaporator;
(e) separating volatile reactants or volatile reaction products wherein the vapor pressure of the volatile reactants or volatile reaction products is about 1 mm of Hg or higher at the temperature of the reaction in step (c) producing a reaction product liquid; and (f) optionally recycling all or a portion of the reaction product liquid now depleted of volatile reactants, volatile reaction products or a combination thereof to the first reactor zone of step (a).

36. A process for forming a reaction product fluid by reaction of a first liquid reactant with a second liquid reactant, which process comprises:

(a) feeding a first liquid reactant at a first pressure into a first reactor zone containing particles having at least one dimension equal to from about ½ to about 1/100 of the largest cross sectional dimension of said first reactor zone measured in the direction which is perpendicular to the flow of said liquid reactant through said first reactor zone;

(b) feeding a second liquid reactant at a second pressure higher than said first pressure into a second reactor zone separated from said first reactor zone by a porous wall capable of being penetrated by said second liquid reactant; and (c) maintaining the pressure within said second reaction zone at all locations of said porous wall higher than the pressure in said first reaction zone, to thereby inhibit any flow of said one or more first reactants, said one or more second reactants, said reaction product fluid or combinations thereof in said first reactor zone through said porous wall from said first reaction zone to said second reaction zone;

whereby said second liquid reactant will pass through said porous wall to contact said first liquid reactant in said first reactor zone and form said reaction product fluid comprising a liquid, a gas, or combinations thereof.

37. The process of claim 36 wherein the process further includes step (d), (e) and (f);

(d) conveying a portion of the reaction product of step (c) to an evaporator;

(e) separating volatile reactants or volatile reaction products wherein the vapor pressure of the volatile reactants or volatile reaction products is about 1 mm of Hg or higher at the temperature of the reaction in step (c) producing a reaction product liquid; and (f) optionally recycling all or a portion of the reaction product liquid now depleted of volatile reactants, volatile reaction products or a combination thereof to the first reactor zone of step (a).

38. The process of claim 36 wherein said porous wall through which said second liquid reactant passes into said first reactor zone has a viscosity normalized permeability ranging from about $5 \times 10^{-6}$ to about $5 \times 10^{-5}$ cm$^3$ cp/cm sec.

39. The process of claim 38 wherein said porous wall comprises one or more porous tubes which separate said first reactor zone from said second reactor zone.

* * * * *